(12) United States Patent
Zhu et al.

(10) Patent No.: US 11,487,190 B2
(45) Date of Patent: Nov. 1, 2022

(54) QUICK MOUNTING STRUCTURE

(71) Applicant: PGYTECH CO., LTD., Jiangsu (CN)

(72) Inventors: Shilei Zhu, Jiangsu (CN); Xiuzhi Yu, Jiangsu (CN)

(73) Assignee: PGYTECH CO., LTD., Jiangsu (CN)

( * ) Notice: Subject to any disclaimer, the term of this patent is extended or adjusted under 35 U.S.C. 154(b) by 9 days.

(21) Appl. No.: 17/288,842

(22) PCT Filed: Feb. 22, 2021

(86) PCT No.: PCT/CN2021/077257
§ 371 (c)(1),
(2) Date: Apr. 26, 2021

(65) Prior Publication Data
US 2022/0214602 A1    Jul. 7, 2022

(30) Foreign Application Priority Data
Jan. 7, 2021  (CN) .......................... 202120037829.4

(51) Int. Cl.
*G03B 17/56* (2021.01)
*F16M 11/04* (2006.01)

(52) U.S. Cl.
CPC ......... *G03B 17/561* (2013.01); *F16M 11/041* (2013.01)

(58) Field of Classification Search
CPC ... G03B 17/561; G03B 17/566; F16M 11/041
See application file for complete search history.

(56) References Cited

U.S. PATENT DOCUMENTS

| 2020/0218139 A1* | 7/2020 | Tiefenbrunn | ............. F16B 2/12 |
| 2021/0109425 A1* | 4/2021 | Jankura | .................. F16M 11/14 |
| 2021/0172563 A1* | 6/2021 | Clark | .................. F16C 11/0604 |

\* cited by examiner

*Primary Examiner* — Christopher E Mahoney
(74) *Attorney, Agent, or Firm* — IP & T Group LLP

(57) ABSTRACT

The quick mounting structure includes a first connector, a second connector, and a self-locking mechanism; the self-locking mechanism is on the second connector, and the first connector is connected to the second connector through the self-locking mechanism; the self-locking mechanism includes a quick mounting block, a transmission arm, a locking block, a rotating shaft, and a first elastic member; the quick mounting block is connected to the first connector; the second connector is provided with a quick mounting groove, and all of the transmission arm, the locking block, the rotating shaft, and the first elastic member are arranged in the quick mounting groove; the transmission arm is rotationally connected to the second connector through the rotating shaft; the first elastic member is connected to the transmission arm or the locking block for enabling the locking block to be in a locked state in a normal state.

20 Claims, 8 Drawing Sheets

QUICK MOUNTING STRUCTURE

CROSS-REFERENCE TO RELATED APPLICATION

This application is a national stage application of PCT/CN2021/077257 filed on Feb. 22, 2021, which claims the priority to the Chinese patent application with the filing No. 202120037829.4 filed on Jan. 7, 2021 with the Chinese Patent Office, and entitled "Quick Mounting Structure", the contents of which are incorporated herein by reference in entirety.

TECHNICAL FIELD

The present disclosure relates to the field of connectors, in particular, to a quick mounting structure.

BACKGROUND ART

For the existing quick mounting structures for photographing, the stability after assembly is not enough, and they are easy to fall from the pan-tilt after the photographic equipment is affected by factors such as external collision.

SUMMARY

Objectives of the present disclosure include, for example, providing a quick mounting structure, which can improve the stability of the quick mounting structure after assembly.

An embodiment of the present disclosure is realized as follows:

The present disclosure provides a quick mounting structure, including a first connector, a second connector, and a self-locking mechanism; the self-locking mechanism is provided on the second connector, and the first connector is connected to the second connector through the self-locking mechanism;

the self-locking mechanism includes a quick mounting block, a transmission arm, a locking block, a rotating shaft, and a first elastic member;

the quick mounting block is connected to the first connector;

the second connector is provided with a quick mounting groove, and all of the transmission arm, the locking block, the rotating shaft, and the first elastic member are arranged in the quick mounting groove;

the transmission arm is rotationally connected to the second connector through the rotating shaft, the locking block is provided on the transmission arm, and the locking block is configured to lock the quick mounting block which has entered the quick mounting groove;

the first elastic member is connected to the transmission arm or the locking block for enabling the locking block to be in a locked state in a normal state; and the rotating shaft is provided on an extension line of a movement track of the quick mounting block.

In one or more optional embodiments, the quick mounting block is provided with a first mounting surface and a second mounting surface which are oppositely arranged;

the first mounting surface is fitted to a side wall of the quick mounting groove, and the second mounting surface is fitted to the locking block;

the first mounting surface is an arc-shaped surface or a plane; and the second mounting surface is provided symmetrical to the first mounting surface.

In one or more optional embodiments, on a symmetrical plane of the first mounting surface and the second mounting surface, a direction perpendicular to an axis of the rotating shaft is a first direction; and the rotating shaft is provided in a region of the quick mounting block projected within the quick mounting groove in the first direction.

In one or more optional embodiments, when the first mounting surface is a plane, on a fitting surface after the second mounting surface and the locking block are fitted, an edge line away from the first connector is a contact reference line, and an included angle $\alpha$ between a plane jointly determined by the axis of the rotating shaft and the contact reference line and the fitting surface is:

$45° \leq \alpha \leq 100°$.

In one or more optional embodiments, a range of the included angle $\alpha$ is:

$80° \leq \alpha \leq 90°$.

In one or more optional embodiments, the self-locking mechanism further includes an unlocking structure, and the unlocking structure is configured to unlock the self-locking mechanism after self-locking.

In one or more optional embodiments, the unlocking structure includes an unlocking arm, the unlocking arm is connected to the transmission arm, and the unlocking arm is configured to drive the transmission arm to rotate to realize an unlocking function.

In one or more optional embodiments, one end of the unlocking arm is fixedly connected to one end of the transmission arm away from the locking block, and both ends are rotationally connected to the rotating shaft.

In one or more optional embodiments, the unlocking structure further includes an unlocking member;

the second connector is provided with an unlocking hole, and the unlocking hole is in communication with the quick mounting groove;

the unlocking member is slidably provided in the unlocking hole, and the unlocking member abuts against the unlocking arm; and the unlocking member is configured to drive one end of the unlocking arm away from the rotating shaft to rotate around the rotating shaft.

In one or more optional embodiments, an included angle $\beta$ between an end surface where the unlocking member abuts against the unlocking arm and a moving direction of the unlocking member is:

$0 < \beta < 90°$.

In one or more optional embodiments, the end surface where the unlocking member abuts against the unlocking arm is an inclined surface.

In one or more optional embodiments, the unlocking structure further includes a second elastic member, and the second elastic member connects the second connector and the unlocking member; and the second elastic member is configured to enable the unlocking member and the unlocking arm to be in a state of being separated from each other as a normal state.

In one or more optional embodiments, the quick mounting groove is provided therein with a limiting portion, and the limiting portion is provided in the quick mounting groove on the second connector; and the limiting portion is configured to define the depth of the quick mounting block which has entered the quick mounting groove.

In one or more optional embodiments, the limiting portion is the limiting plate, and the limiting plate is provided on the side wall of the quick mounting groove;

the limiting plate divides the quick mounting groove into an upper limiting groove and a lower driving groove;

the upper limiting groove and the lower driving groove are in communication with each other, the locking block is capable of reciprocating in the upper limiting groove and the lower driving groove, the quick mounting block is provided in the upper limiting groove, and the rotating shaft is provided in the lower driving groove.

In one or more optional embodiments, the first elastic member is a spring.

In one or more optional embodiments, the second connector includes an upper seat and a bottom plate, and the quick mounting groove is provided on the upper seat; and the bottom plate is provided at one end of the upper seat away from the first connector, and the rotating shaft is provided on the bottom plate.

In one or more optional embodiments, a support is provided on the bottom plate, and the rotating shaft is provided on the support.

Beneficial effects of the embodiments of the present disclosure are as follows:

the rotating shaft in the quick mounting structure is provided on the extension line of the movement track of the quick mounting block, so that a locked state can be formed among the rotating shaft, the locking block, and the quick mounting block, thereby ensuring connection stability between the first connector provided with the quick mounting block and the second connector provided with the self-locking mechanism.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

Figure 1:
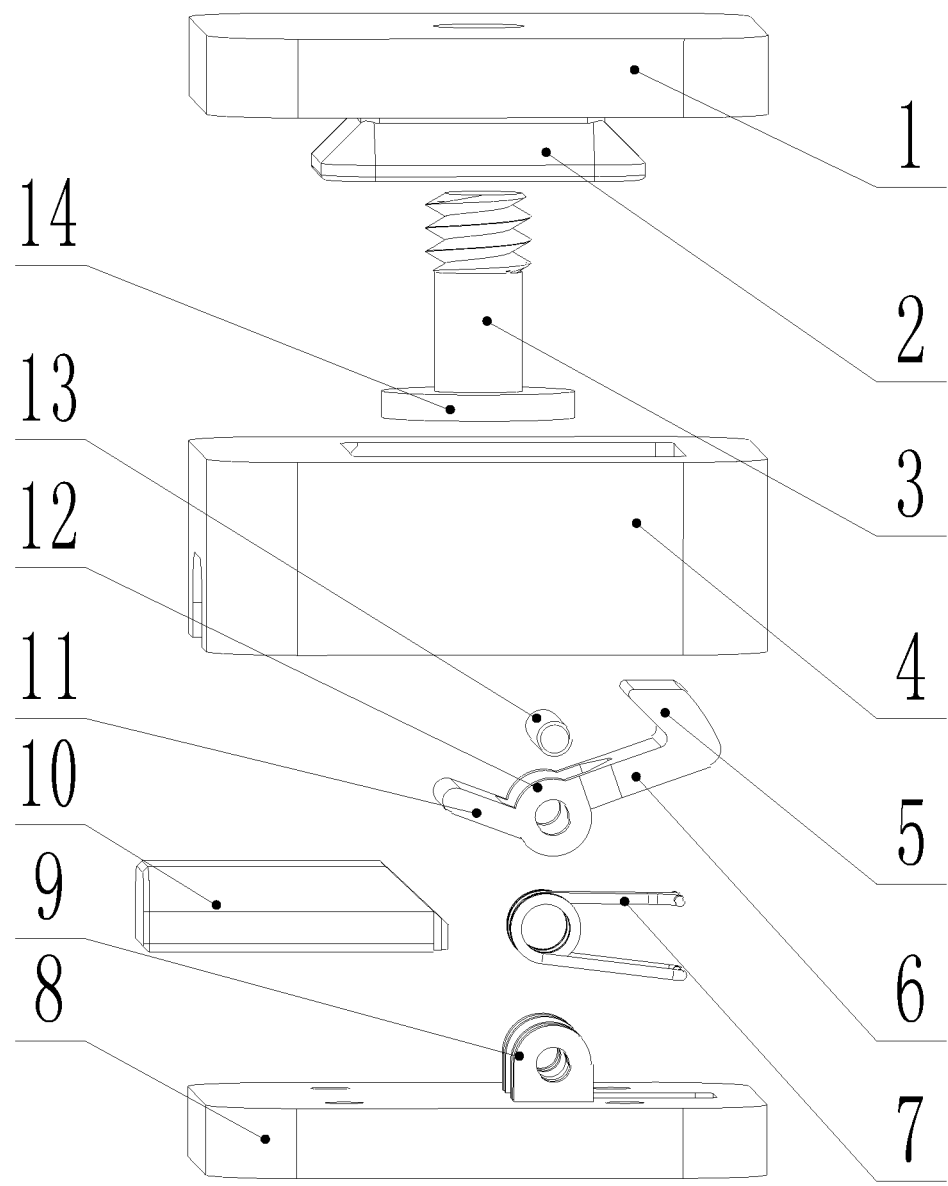
FIG. 1 is an exploded view of a quick mounting structure provided in an embodiment of the present disclosure.
Figure 2:
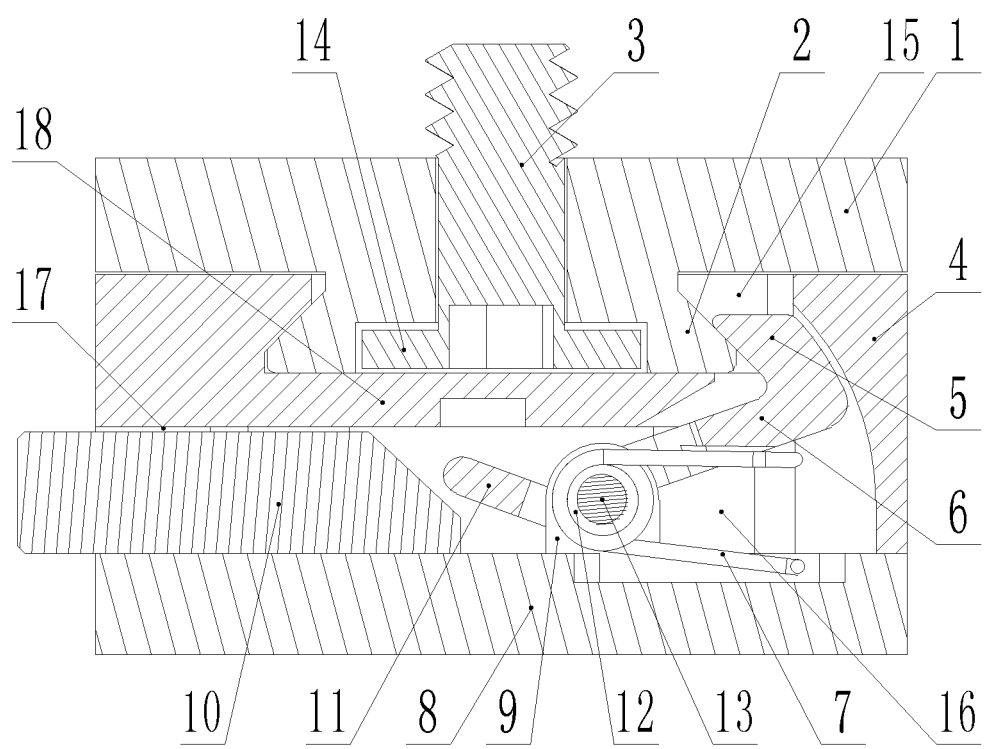
FIG. 2 is an internal sectional view of the quick mounting structure provided in an embodiment of the present disclosure.

Reference signs: 1—quick mounting plate; 2—quick mounting block; 3—connecting rod; 4—upper seat; 5—locking block; 6—transmission arm; 7—first elastic member; 8—bottom plate; 9—support; 10—unlocking member; 11—unlocking arm; 12—rotation sleeve; 13—rotating shaft; 14—positioning block; 15—upper limiting groove; 16—lower driving groove; 17—unlocking hole; 18—limiting plate; 19—first mounting surface; 20—second mounting surface; 21—fitting surface; 22—moment surface.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, apparently, the embodiments described are some but not all embodiments of the present disclosure. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the scope claimed in the present disclosure, but merely illustrates chosen embodiments of the present disclosure. All of other embodiments obtained by those ordinarily skilled in the art based on the embodiments of the present disclosure without using any creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "center", "upper", "lower", "left", "right", "vertical", "horizontal", "inner", and "outer" are based on orientation or positional relationships as shown in the figures, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure. Besides, terms such as "first", "second", and "third" are merely for distinctive description, but should not be construed as indicating or implying importance in the relativity.

Moreover, the terms "horizontal", "vertical", "overhanging", and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "set", "install", "link", and "connect" should be understood in a broad sense, for example, connection may be fixed connection, detachable connection, or integrated connection; it may be mechanical connection or electrical connection; it may be direct joining or indirect joining through an intermediary, and it also may be inner communication between two elements. For those ordinarily skilled in the art, specific meanings of the above-mentioned terms in the present disclosure could be understood according to specific circumstances.

Some embodiments of the present disclosure are described in detail below in combination with FIG. 1-FIG. 11. The following embodiments and features in the embodiments may be combined with each other if there is no conflict.

The quick mounting structure related to in the present disclosure is mainly used in the photographic direction, that is, for quickly mounting photographic equipment on a pan-tilt.

Specifically, the present disclosure provides a quick mounting structure, including a first connector, a second connector, and a self-locking mechanism; the self-locking mechanism is provided on the second connector, and the first connector is connected to the second connector through the self-locking mechanism; the self-locking mechanism includes a quick mounting block 2, a transmission arm 6, a locking block 5, a rotating shaft 13, and a first elastic member 7; the quick mounting block 2 is connected to the first connector; the second connector is provided with a quick mounting groove, and all of the transmission arm 6, the locking block 5, the rotating shaft 13, and the first elastic member 7 are arranged in the quick mounting groove; the transmission arm 6 is rotationally connected to the second connector through the rotating shaft 13, the locking block 5 is provided on the transmission arm 6, and the locking block 5 is configured to lock the quick mounting block 2 which has entered the quick mounting groove; and the first elastic member 7 is connected to the transmission arm 6 or the locking block 5 for enabling the locking block 5 to be in a locked state in a normal state.

In the present embodiment, the first connector is configured to connect photographic equipment, or the photographic equipment is taken as the first connector, and likewise, the second connector is configured to connect pan-tilt, or the pan-tilt is taken as the second connector.

In the present embodiment, the self-locking mechanism includes two parts provided on the first connector and the second connector, respectively, and when the two parts of the self-locking mechanism are fixedly connected, fixed connection between the first connector and the second connector may be just realized.

Specifically, in the present embodiment, the two parts of the self-locking mechanism are the quick mounting block 2 provided on the first connector, and the locking block 5 provided on the second connector, respectively, and the first connector and the second connector are fixedly connected together after the quick mounting block 2 is locked by the locking block 5.

More specifically, in the present embodiment, the locking block 5 is connected to the rotating shaft 13 through the transmission arm 6, so that the locking block 5 can rotate around the rotating shaft 13, and locking and unlocking of the quick mounting block 2 are realized through bidirectional rotation of the locking block 5.

In the present embodiment, the first elastic member 7 is provided on the locking block 5 or on the transmission arm 6, so that the stability of the locking block 5 on the quick mounting block 2 can be ensured when the locking block 5 locks the quick mounting block 2; and when the quick mounting block 2 is being installed, after the locking block 5 is squeezed open by pressure, the locking block 5 can be reset under the action of the first elastic member 7, thus realizing the locking of the quick mounting block 2.

In an optional embodiment, the quick mounting block 2 is provided with a first mounting surface 19 and a second mounting surface 20 which are oppositely arranged; the first mounting surface 19 is fitted to a side wall of the quick mounting groove, and the second mounting surface 20 is fitted to the locking block 5; the first mounting surface 19 is an arc-shaped surface or a plane; and the second mounting surface 20 is provided symmetrical to the first mounting surface 19.

Specifically, in the present embodiment, two side surfaces provided opposite to each other on the quick mounting block 2 are mounting surfaces, which are fitted to the side wall of the quick mounting groove and the locking block 5, respectively.

Specifically, in the present embodiment, the cross-sectional shape of the quick mounting block 2 is isosceles trapezoid. In this case, two inclined surfaces of the quick mounting block 2 are the first mounting surface 19 and the second mounting surface 20, respectively, and a short side of the isosceles trapezoid is connected to the first connector.

It should be indicated that the cross-sectional shape of the quick mounting block 2 may be isosceles trapezoid, while it is not merely limited to the isosceles trapezoid, but may also be other shapes having an inclined side, as long as the quick mounting block 2 is locked through cooperation between the locking block 5 and the second mounting surface 20.

More specifically, in the present embodiment, the shape of the quick mounting block 2 is a square tapered shape, with a relatively small bottom surface connected to the first connector.

In the present embodiment, the first mounting surface 19 and the second mounting surface 20 are both planes, and they may also be provided as arc-shaped surfaces, and meanwhile, the side wall of the quick mounting groove and a side surface of the locking block 5 close to the second mounting surface 20 are also correspondingly adjusted according to the shapes of the first mounting surface 19 and the second mounting surface 20.

That is to say, the first mounting surface 19 and the side wall of the quick mounting groove are fitted in the self-locking state of the quick mounting block 2, and the second mounting surface 20 and the surface of the locking block 5 are fitted in the self-locking state of the locking block 5.

On a symmetrical plane of the first mounting surface and the second mounting surface, a direction perpendicular to an axis of the rotating shaft is a first direction; and the rotating shaft is provided in a projection region of the quick mounting block in the first direction within the quick mounting groove.

Figure 5:
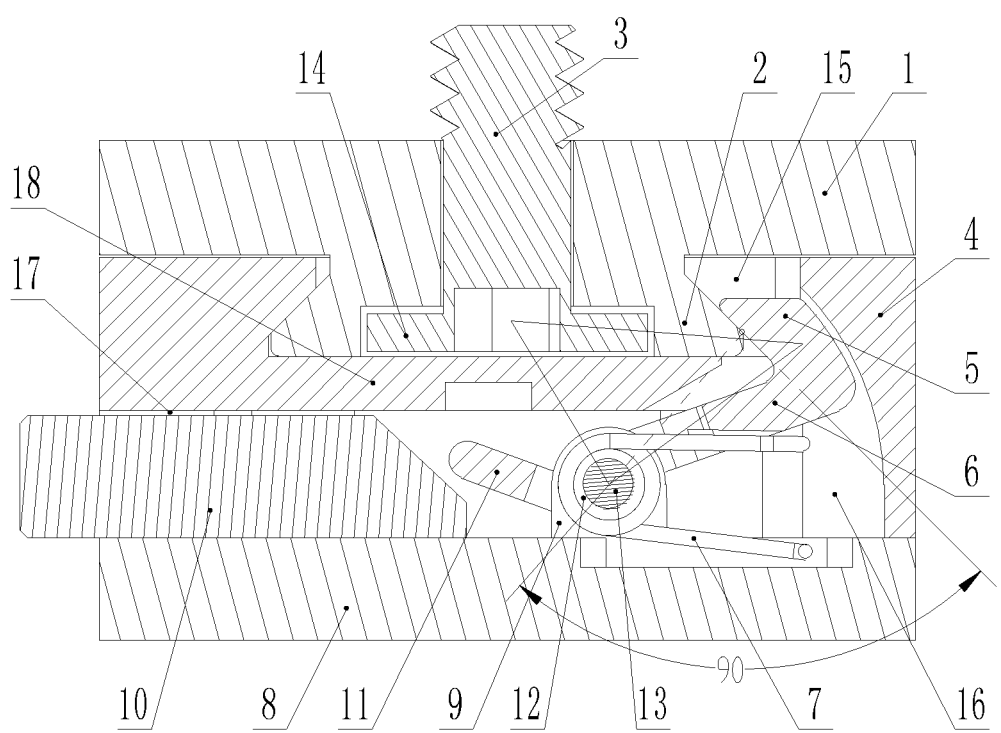
FIG. 5 is a schematic view of positional relationship among the locking block, the quick mounting block, and a rotating shaft in the quick mounting structure provided in an embodiment of the present disclosure.
Figure 6:
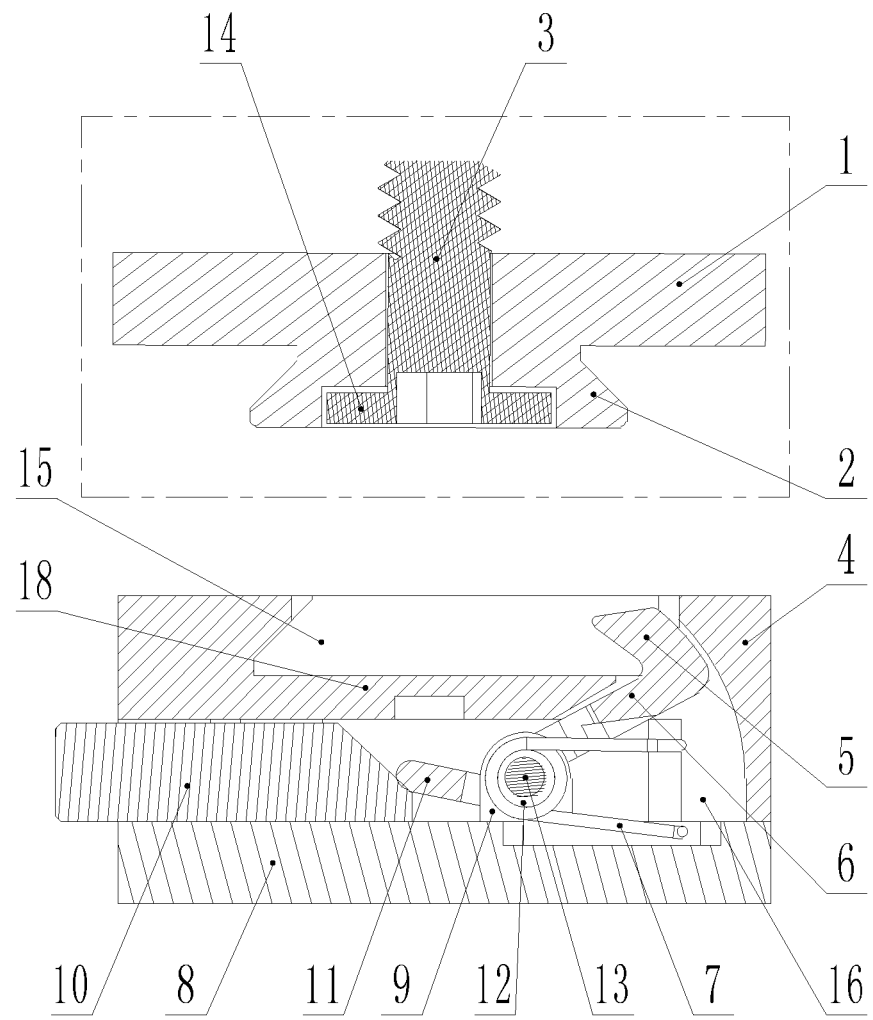
FIG. 6-FIG. 8 are schematic views of a separated state, a mounting state, and a locked state of a first connector and a second connector in the quick mounting structure provided in an embodiment of the present disclosure.
Figure 7:
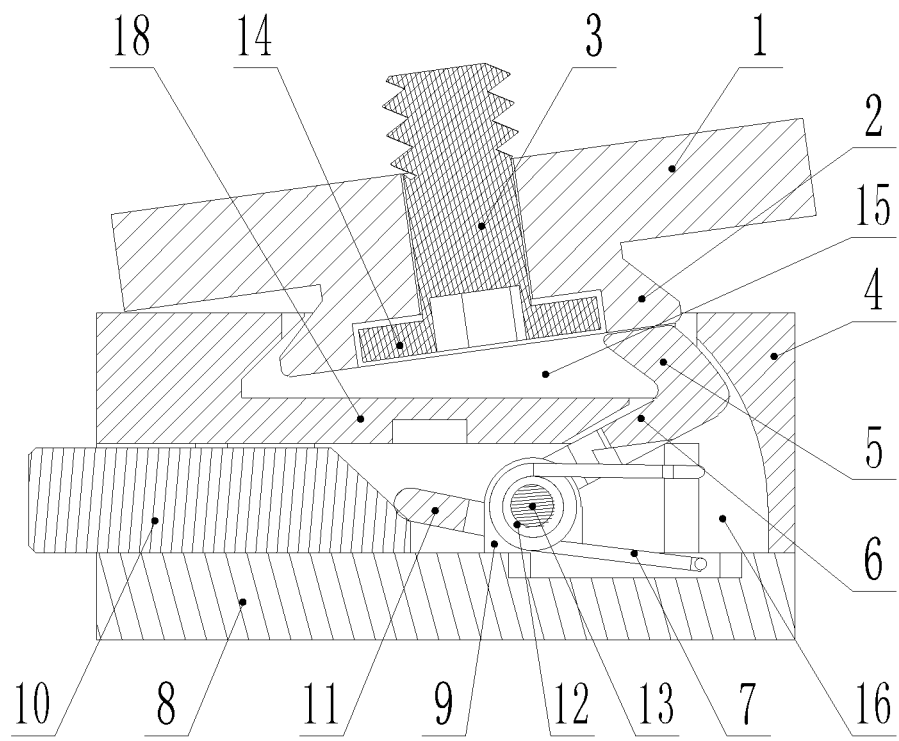
Figure 8:
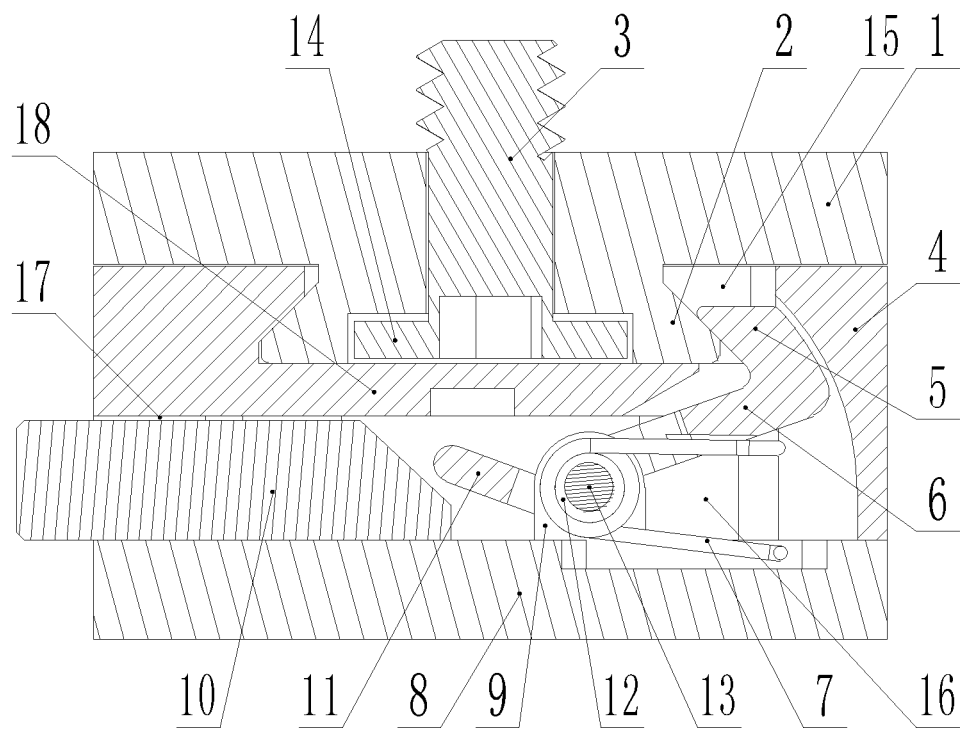
Figure 9:
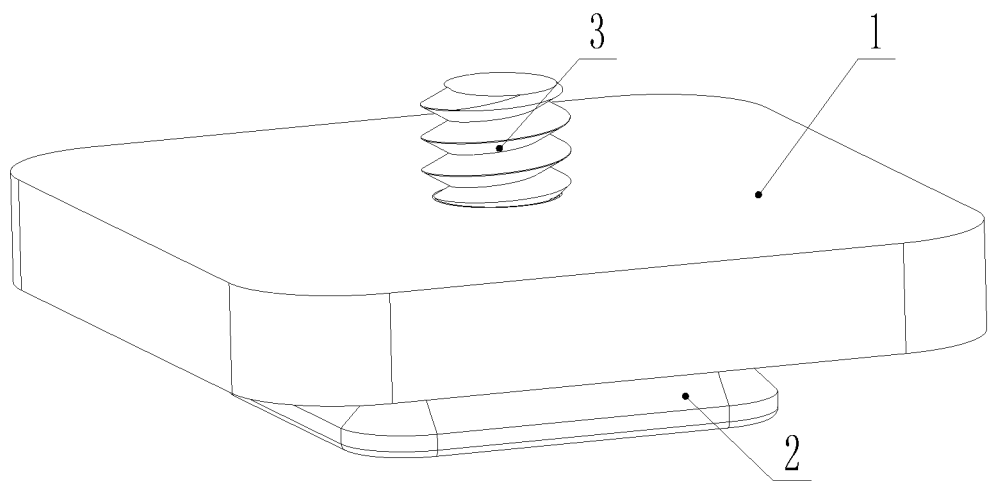
FIG. 9 is a perspective structural schematic view of the first connector of the quick mounting structure provided in an embodiment of the present disclosure.
Figure 10:
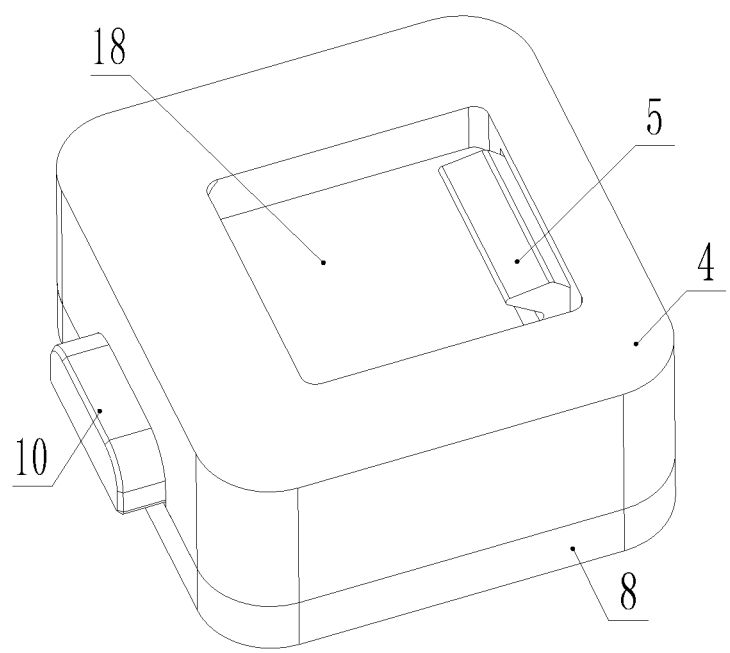
FIG. 10 is a perspective structural schematic view of the second connector of the quick mounting structure provided in an embodiment of the present disclosure.
Figure 11:
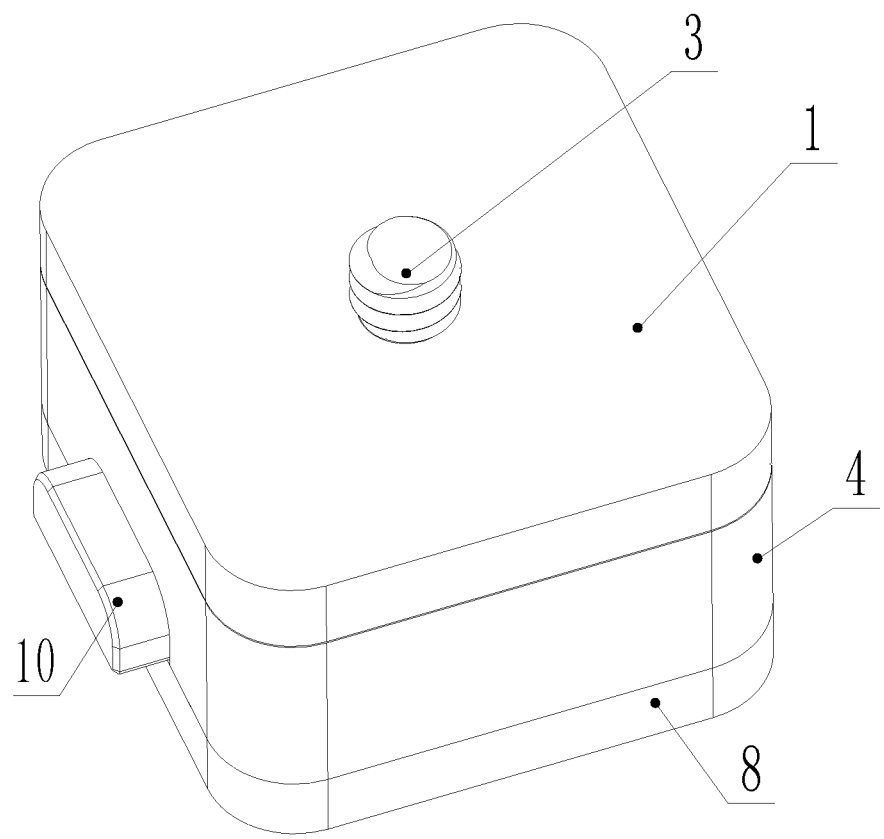
FIG. 11 is a perspective structural schematic view of the assembled quick mounting structure provided in an embodiment of the present disclosure.

Specifically, in the present embodiment, the rotating shaft 13 is provided in the projection region of the quick mounting block 2 in the first direction, and after being installed into the quick mounting groove, the quick mounting block 2 is locked by the locking block 5, and the position of the locking block 5, the position of the quick mounting block 2, and the position of the rotating shaft 13 form an acute triangle, as shown by the triangle in FIG. 5, in turn, the locking of the locking block 5 to the quick mounting block 2 is the most stable.

In the present embodiment, the position of the locking block 5, the position of the quick mounting block 2, and the position of the rotating shaft 13 may be centers of gravity of the three, respectively, or in a certain cross section simultaneously having the three, geometric centers, geometric centers of gravity of the three, and the like.

In an optional embodiment, when the first mounting surface 19 is a plane, on a fitting surface 21 after the second mounting surface 20 and the locking block 5 are fitted, an edge line away from the first connector is a contact reference line, and an included angle α between a plane jointly determined by the axis of the rotating shaft 13 and the contact reference line and the fitting surface 21 is:

$$45° \leq \alpha \leq 100°.$$

Figure 4:
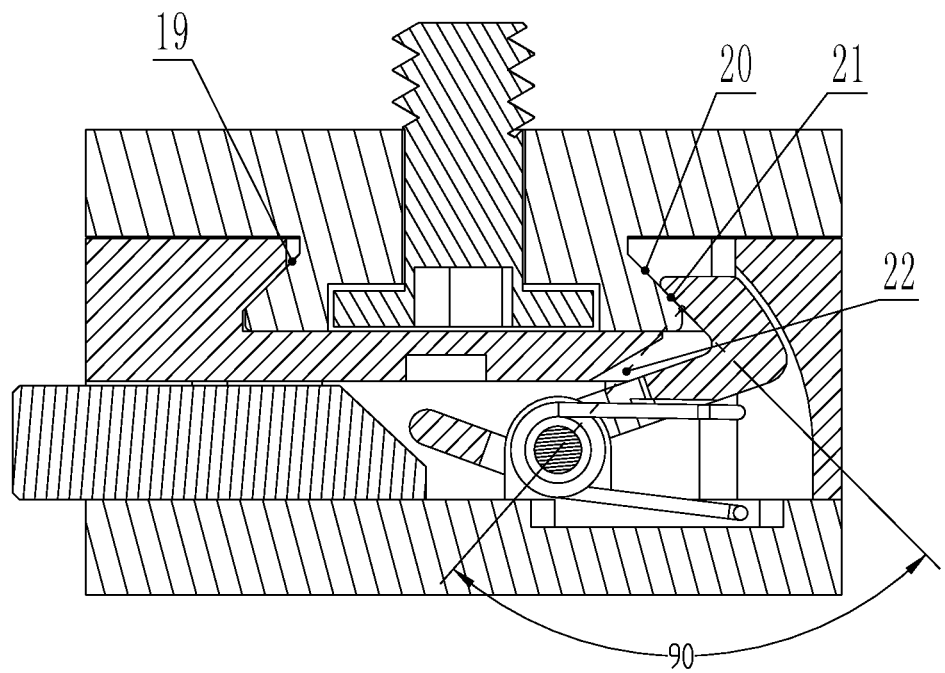
FIG. 4 is an analysis view of a stress surface between the locking block and the quick mounting block of the quick mounting structure provided in an embodiment of the present disclosure.

Specifically, in the present embodiment, when the first mounting surface 19 and the second mounting surface 20 are both planes, among edge lines of the fitting surface 21 formed between the second mounting surface 20 and the locking block 5, the edge line away from the first connector is defined as the contact reference line. In the above, in the present embodiment, the contact reference line is a straight line, and the contact reference line is parallel to the axis of the rotating shaft 13, so that the contact reference line and the axis of the rotating shaft 13 can be arranged on the same plane, i.e. one plane can be determined by the contact reference line and the axis of the rotating shaft 13. In the present disclosure, this plane is defined as a moment surface 22, as shown in FIG. 4.

In the present embodiment, the included angle α between the moment surface 22 and the fitting surface 21 between the second mounting surface 20 and the locking block 5 has the following relationship: 45°≤α≤100°, so that the rotating shaft 13 can give the locking block 5 a self-locking force towards the direction of the quick mounting block 2, thereby ensuring the stability of self-locking.

Figure 3:
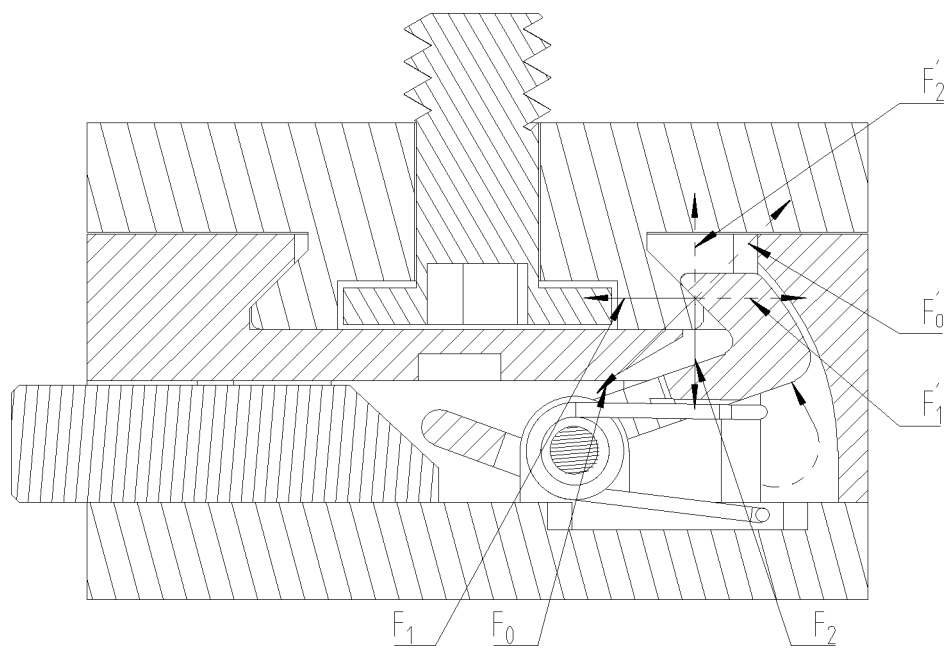
FIG. 3 is an analysis view of an acting force between a locking block and a quick mounting block in the quick mounting structure provided in an embodiment of the present disclosure.

Specifically, as shown in FIG. 3, when the force is analyzed on the fitting surface 21, a locking force applied by the locking block 5 to the quick mounting block 2 is $F_0$ towards the lower left, which may be divided into a component force $F_1$ in a horizontal direction and a component force $F_2$ in a vertical direction, in this case, the quick mounting block 2 will give a reacting force $F'_0$ to the locking block 5, and $F'_0$ is divided, then a reverse horizontal component force $F'_1$ and a reverse vertical component force $F'_2$ may be obtained. In this case, the direction of the reverse horizontal component force is the direction away from the quick mounting block 2, and the position of the rotating shaft 13 connected to the locking block 5 through the transmission arm 6 is in the direction of the locking block 5 close to the quick mounting block 2, further the rotating shaft 13 locks the locking block 5 through the transmission arm 6, thereby avoiding the locking block 5 from moving towards the direction away from the quick mounting block 2, and achieving the self-locking function of the locking block 5.

Therefore, when the angle of α is 45°≤α≤100°, the self-locking force of the locking block 5 can be ensured, and the stability of the locking block 5 in self-locking is ensured.

Preferably, in the present embodiment, 80°≤α≤90°.

In an optional embodiment, the self-locking mechanism further includes an unlocking structure, and the unlocking structure is configured to unlock the self-locking mechanism after self-locking.

After the self-locking mechanism locks the quick mounting block 2, in order to realize unlocking of the quick mounting block 2, and further to realize the dismounting function, on the basis of the self-locking mechanism, the unlocking structure is further provided.

Specifically, in an optional embodiment, the unlocking structure includes an unlocking arm 11, the unlocking arm 11 is connected to the transmission arm 6, and the unlocking arm 11 is configured to drive the transmission arm 6 to rotate to realize an unlocking function.

In the present embodiment, the unlocking arm 11 is connected to and provided on the transmission arm 6, and by pulling the unlocking arm 11, the transmission arm 6 can be driven to rotate around the rotating shaft 13, so as to drive the locking block 5 to move, thus finally achieving the purpose of removing the quick mounting block 2.

Specifically, in the present embodiment, one end of the unlocking arm 11 is fixedly connected to one end of the transmission arm 6 away from the locking block 5, and both ends are rotationally connected to the rotating shaft 13.

More specifically, a rotation sleeve 12 is rotationally provided on the rotating shaft 13, one end of the unlocking arm 11 is fixedly connected to an outer wall of the rotation sleeve 12, and one end of the transmission arm 6 away from the locking block 5 is also fixedly connected to an outer wall of the rotation sleeve 12, in turn when the unlocking arm 11 rotates, the transmission arm 6 will be driven by the rotation sleeve 12 to rotate around the rotation sleeve 13.

In an optional embodiment, the unlocking structure further includes an unlocking member 10; the second connector is provided with an unlocking hole 17, and the unlocking hole 17 is in communication with the quick mounting groove; the unlocking member 10 is slidably provided in the unlocking hole 17, and the unlocking member 10 abuts against the unlocking arm 11; the unlocking member 10 is configured to drive one end of the unlocking arm 11 away from the rotating shaft 13 to rotate around the rotating shaft 13.

In the present embodiment, the rotating shaft 13 is provided on the second connector, which is relatively farther from the outer surface of the second connector, so that when unlocking is performed through the unlocking arm 11, rotation amplitude of one end of the unlocking arm 11 away from the rotating shaft 13 is relatively large.

In order to solve the above problem, in the present embodiment, the unlocking member 10 is added, and the unlocking arm 11 is driven by the unlocking member 10 to rotate about the rotating shaft 13, further driving the transmission arm 6 and the locking block 5 to rotate around the rotating shaft 13, thereby finally achieving the unlocking function.

Specifically, in the present embodiment, the unlocking member 10 is inserted into the quick mounting groove through the unlocking hole 17, and abuts against the unlocking arm 11, and the unlocking arm 11 is driven to rotate through the sliding of the unlocking member 10.

More specifically, in the present embodiment, the unlocking member 10 is rod-shaped.

In an optional embodiment, an included angle β between an end surface where the unlocking member 10 abuts against the unlocking arm 11 and the moving direction of the unlocking member 10 is:

$$0 < \beta < 90°.$$

That is to say, in the present embodiment, the end surface where the unlocking member 10 abuts against the unlocking arm 11 is an inclined surface, and by providing the inclined surface, the unlocking member 10 can be easily inserted between the unlocking arm 11 and a groove wall or a groove bottom of the quick mounting groove, that is, the unlocking arm 11 can be easily pushed to rotate around the rotating shaft 13.

In a preferred embodiment, $\beta=45°$.

Specifically, in the present embodiment, the unlocking member 10 has one end being an inclined surface, and the other end exposed outside the second connector. When an end portion of the unlocking member 10 exposed outside is pressed, the unlocking member 10 slides towards an inner direction in the unlocking hole 17, so that the inclined surface of the unlocking member 10 is brought into abutment with the unlocking arm 11, the direction of the force is converted by the inclined surface, further axial movement of the unlocking member 10 is changed into rotation of the unlocking arm 11 around a central axis, and then the transmission arm 6 is driven to rotate through the rotation of the unlocking arm 11, and finally the locking block 5 is driven to be separated from the quick mounting block 2, thus realizing the dismantling function of the quick mounting structure.

More specifically, in the present embodiment, the inclined surface is a planar structure.

It should be indicated that the inclined surfaces may also be provided in a structural shape such as arc shape, as long as the purpose of driving the unlocking arm 11 to rotate can be realized through the arrangement of the inclined surface.

In an optional embodiment, the unlocking structure further includes a second elastic member, and the second elastic member connects the second connector and the unlocking member 10; and the second elastic member is configured to enable the normal state between the unlocking member 10 and the unlocking arm 11 to be a separated state.

In the present embodiment, under the action of the second elastic member, the normal state of one end of the unlocking member 10 away from the unlocking arm 11 is exposed outside the second connector, and one end of the unlocking member 10 close to the unlocking arm 11 and the unlocking arm 11 are in a normally open state. That is to say, under the action of the second elastic member, when the unlocking operation is not performed on the unlocking member 10, an outer end thereof is always exposed outside the second connector, and an inner end thereof is not in contact with the unlocking arm 11.

When the unlocking operation is performed, the unlocking member 10 is pressed to enable it to move inwards, and after the unlocking member is in contact with the unlocking arm 11, the unlocking arm 11 is driven to rotate, to separate the locking block 5 from the quick mounting block 2, thus realizing the unlocking function; after the unlocking is completed, the unlocking member 10 is released, and the unlocking member 10 is reset under the action of the second elastic member, that is, the unlocking member is restored to an initial position, and kept in a state that the outer end is exposed, and the inner end is separated from the unlocking arm 11, so as to facilitate the unlocking operation again.

Specifically, in the present embodiment, the second elastic member may be a pressure spring, a pulling spring, a torsional spring, an elastic sheet, etc., as long as the second elastic member has certain elasticity, and can enable the unlocking member 10 to be reset after the unlocking function is realized.

It should be noted that, in the present embodiment, the unlocking arm 11 is driven to rotate by pressing the unlocking member 10, and further the unlocking function is implemented, but the unlocking manner is not limited thereto, for example, the unlocking manner further may be as follows: the transmission arm may be directly acted on through a key, to drive the transmission arm to rotate for unlocking, wherein the key may be manually pressed, or automatically pressed by a cylinder, an oil cylinder or the like, as long as the unlocking of the self-locking mechanism can be realized through the unlocking structure.

In an optional embodiment, the quick mounting groove is provided therein with a limiting portion, and the limiting portion is provided in the quick mounting groove on the second connector; and the limiting portion is configured to define the depth of the quick mounting block 2 which has entered the quick mounting groove.

Specifically, by providing the limiting portion, the limiting portion not only can define the depth of the quick mounting block 2 which has entered the quick mounting groove, but also can prevent the quick mounting block 2 from being disengaged from the quick mounting groove by an action such as turning in the quick mounting groove, that is to say, the position of the quick mounting block 2 in the quick mounting groove is limited at the same time through the limiting portion.

In an optional embodiment, the limiting portion is the limiting plate 18, and the limiting plate 18 is provided on the side wall of the quick mounting groove; the limiting plate 18 divides the quick mounting groove into an upper limiting groove 15 and a lower driving groove 16; the upper limiting groove 15 and the lower driving groove 16 are in communication with each other, the locking block 5 can reciprocate in the upper limiting groove 15 and the lower driving groove 16, the quick mounting block 2 is provided in the upper limiting groove 15, and the rotating shaft 13 is provided in the lower driving groove 16.

Specifically, in the present embodiment, one end of the limiting plate 18 is fixedly provided on a side wall of the quick mounting groove, the locking block 5 realizes the movement in a vertical direction of the limiting plate 18 at the other end of the limiting plate 18, that is, there is a gap between the limiting plate 18 and at least one side wall of the quick mounting groove, then the locking block 5 and the transmission arm 6 can be allowed to be connected to the quick mounting block 2 above the limiting plate 18 and the rotating shaft 13 below the limiting plate 18, respectively, and there is a space for locking and unlocking the locking block 5, further ensuring normal use of the apparatus.

Specifically, in the present embodiment, by providing the limiting plate 18, the quick mounting groove is divided into two parts, the upper limiting groove 15 and the lower driving groove 16, respectively, wherein the upper limiting groove 15 is mainly configured to limit and lock the quick mounting block 2, the rotating shaft 13, the unlocking arm 11, and the first elastic member 7 are all provided in the lower driving groove 16, the transmission arm 6 has one end connected to the rotating shaft 13, and the other end connected to the locking block 5, and under the action of the first elastic member 7, the locking block 5 can be pushed into the upper limiting groove 15, so that the locking block 5 is brought into abutment with the quick mounting block 2, thus realizing the locking to the quick mounting block 2, and further realizing the locking between the first connector and the second connector.

In the present embodiment, the unlocking hole 17 is in communication with the lower driving groove 16, and the unlocking member 10 abuts against the unlocking arm 11 through the unlocking hole 17, thus realizing the separation between the locking block 5 and the quick mounting block 2.

In order to increase the rotation amplitude of the unlocking arm 11, a lower surface of the limiting plate 18 may be slotted at a position corresponding to the unlocking arm 11.

Specifically, in the present embodiment, the periphery of the limiting plate 18 also may be fixedly connected to the quick mounting groove so as to ensure the mounting stability of the limiting plate 18, and meanwhile, a hole is provided on the limiting plate 18, so that the locking block 5 and the transmission arm 6 can pass through the hole in the limiting plate 18 to realize locking and unlocking to the quick mounting block 2.

It should be indicated that the structure of the limiting portion may be the limiting plate 18, but it is not merely limited to the limiting plate 18, while it may also be other structures, for example, an annular limiting strip provided on the side wall of the quick mounting groove, or a plurality of limiting blocks provided in a ring shape, as long as the locked position of the quick mounting block 2 can be limited, and the locking stability of the locked quick mounting block 2 can be ensured by providing the limiting portion in the quick mounting groove.

In an alternative embodiment, the first elastic member 7 is a spring.

Specifically, in the present embodiment, the first elastic member 7 is a torsional spring. A middle portion of the torsional spring is sleeved on the rotating shaft 13, one protruding end of the torsional spring abuts against a bottom portion of the lower driving groove 16, and the other protruding end of the torsional spring abuts against one side of the transmission arm 6 away from the locking block 5.

It should be indicated that the spring used in the present embodiment is a torsional spring, but it is not merely limited to the torsional spring, while it may also be of other spring types, for example, a pressure spring, or a pulling spring may be used, as long as a self-locking thrust can be applied to the locking block 5.

It further should be indicated that the first elastic member 7 in the present embodiment is a spring, but it is not merely limited to the spring, while it may also be of other elastic members, for example, an elastic sheet or the like may be used.

It further should be indicated that, in the present embodiment, the locking block 5 is provided with the self-locking power by the first elastic member 7, but it is not merely limited to this manner with the first elastic member 7, for example, a cylinder, an oil cylinder or the like may also be used, as long as the locking block 5 can be driven to rotate around the rotating shaft 13, to further realize the locking to the quick mounting block 2.

In an optional embodiment, the first connector includes a quick mounting plate 1 and a connecting rod 3; the quick mounting plate 1 is provided with a counterbore, one end of the connecting rod 3 is provided with a positioning block 14, and the other end of the connecting rod 3 is provided with a connecting structure. After the connecting rod 3 passes through the counterbore, the connecting structure is extended out, and the connecting structure is used for connecting the quick mounting plate 1 with a device that needs to be connected.

In the present embodiment, stable connection of other devices to the quick mounting plate 2 is realized by the connecting rod 3 and the quick mounting plate 1.

Specifically, in the present embodiment, the positioning block 14 provided at an end portion of the connecting rod 3 is provided in the counterbore in the quick mounting plate 1, and the connecting rod 3 is connected to other devices after passing through the counterbore, wherein a part of the connecting rod 3 passing through the counterbore has an external thread, and can be connected to other devices through threaded connection.

In an optional embodiment, the second connector includes an upper seat 4 and a bottom plate 8, and the quick mounting groove is provided on the upper seat 4; the bottom plate 8 is provided at one end of the upper seat 4 away from the first connector, and the rotating shaft 13 is provided on the bottom plate 8.

In the present embodiment, the second connector is divided into two parts, and the rotating shaft 13, the first elastic member 7, the transmission arm 6, and the locking block 5 in the quick mounting groove can be easily mounted.

Specifically, after the rotating shaft 13, the first elastic member 7, the transmission arm 6, the locking block 5, the unlocking arm 11, the unlocking member 10, and the second elastic member are provided in the lower driving groove 16, the bottom plate 8 is fixedly connected to the upper seat 4.

In the present embodiment, a support 9 further may be provided on the bottom plate 8, the rotating shaft 13 is provided on the support 9, and after the parts and components such as the unlocking arm 11, the rotation sleeve 12, the transmission arm 6, the locking block 5, and the first elastic member 7 are all mounted on the bottom plate 8, the bottom plate 8 is mounted on the upper seat 4, so that various parts and components can be fitted into the lower driving groove 16, thereby facilitating the installation of various parts and components.

In the present embodiment, the locking block 5, the transmission arm 6, the rotation sleeve 12, and the unlocking arm 11 are integrally provided, then the connection strength between various parts and components can be ensured.

Specifically, in the present embodiment, the fixed connection manner between the bottom plate 8 and the upper seat 4 may be welding, so as to ensure the stability of the connection, and the fixed connection manner may also be bolted connection, so that various parts and components in the lower driving groove 16 can be maintained after dismantling the bottom plate 8.

It should be understood that the quick mounting structure provided in the present disclosure may be used in a quick mounting direction of photographic equipment on a pan-tilt, but it is not merely limited to this application direction, while it may also be applied in other directions, for example, on the quick installation and fixing of mobile phone holders, as long as the quick mounting between two components is required.

The beneficial effects of the embodiments of the present disclosure are as follows:

the rotating shaft 13 in the quick mounting structure is provided on an extension line of a movement track of the quick mounting block 2, so that a locked state can be formed between the rotating shaft 13, the locking block 5, and the quick mounting block 2, thereby ensuring connection stability between the first connector provided with the quick mounting block 2 and the second connector provided with the self-locking mechanism.

The above-mentioned are merely for preferred embodiments of the present disclosure and not used to limit the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

INDUSTRIAL APPLICABILITY

The quick mounting structure in the present disclosure can improve the stability of the quick mounting structure after being assembled.

What is claimed is:

1. A quick mounting structure, comprising a first connector, a second connector, and a self-locking mechanism, wherein the self-locking mechanism is arranged on the second connector, and the first connector is connected to the second connector through the self-locking mechanism, wherein the self-locking mechanism comprises a quick mounting block, a transmission arm, a locking block, a rotating shaft, and a first elastic member, wherein
    the quick mounting block is connected to the first connector;
    the second connector is provided with a quick mounting groove, and all of the transmission arm, the locking block, the rotating shaft, and the first elastic member are arranged in the quick mounting groove;
    the transmission arm is rotationally connected to the second connector through the rotating shaft, the locking block is arranged on the transmission arm, and the locking block is configured to lock the quick mounting block which has entered the quick mounting groove; and
    the first elastic member is connected to the transmission arm or the locking block, so as to enable the locking block, in a normal state, to be in a locked state.

2. The quick mounting structure according to claim 1, wherein the quick mounting block is provided with a first mounting surface and a second mounting surface which are oppositely arranged, wherein
    the first mounting surface is fitted to a side wall of the quick mounting groove, and the second mounting surface is fitted to the locking block;
    the first mounting surface is an arc-shaped surface or a plane; and
    the second mounting surface is arranged symmetrical to the first mounting surface.

3. The quick mounting structure according to claim 2, wherein on a symmetrical plane of the first mounting surface and the second mounting surface, a direction perpendicular to an axis of the rotating shaft is a first direction; and
    the rotating shaft is provided in a region of the quick mounting block projected within the quick mounting groove in the first direction.

4. The quick mounting structure according to claim 2, wherein when the first mounting surface is a plane, on a fitting surface after the second mounting surface and the locking block are fitted, an edge line away from the first connector is a contact reference line, and a range of an included angle α between the fitting surface and a plane which is jointly determined by an axis of the rotating shaft and the contact reference line is:

$$45°≤α≤100°.$$

5. The quick mounting structure according to claim 4, wherein a range of the included angle α is: $80°≤α≤90°$.

6. The quick mounting structure according to claim 2, wherein the quick mounting groove is provided therein with a limiting portion, wherein the limiting portion is arranged in the quick mounting groove on the second connector; and
    the limiting portion is configured to define a depth of the quick mounting block which has entered the quick mounting groove.

7. The quick mounting structure according to claim 2, wherein the first elastic member is a spring.

8. The quick mounting structure according to claim 2, wherein the second connector comprises an upper seat and a bottom plate, wherein the quick mounting groove is arranged on the upper seat; and
    the bottom plate is arranged at one end of the upper seat away from the first connector, and the rotating shaft is arranged on the bottom plate.

9. The quick mounting structure according to claim 1, wherein the self-locking mechanism further comprises an unlocking structure, wherein the unlocking structure is configured to unlock the self-locking mechanism after self-locking.

10. The quick mounting structure according to claim 9, wherein the unlocking structure comprises an unlocking arm, wherein the unlocking arm is connected to the transmission arm, and the unlocking arm is configured to drive the transmission arm to rotate, so as to realize an unlocking function.

11. The quick mounting structure according to claim 10, wherein one end of the unlocking arm is fixedly connected to one end of the transmission arm away from the locking block, and both ends are rotationally connected to the rotating shaft.

12. The quick mounting structure according to claim 10, wherein the unlocking structure further comprises an unlocking member; and
    the second connector is provided with an unlocking hole, and the unlocking hole is in communication with the quick mounting groove, wherein
    the unlocking member is slidably arranged in the unlocking hole, and the unlocking member abuts against the unlocking arm; and
    the unlocking member is configured to drive one end of the unlocking arm away from the rotating shaft to rotate around the rotating shaft.

13. The quick mounting structure according to claim 12, wherein an included angle β between an end surface where the unlocking member abuts against the unlocking arm and a moving direction of the unlocking member is:

$$0<β<90°.$$

14. The quick mounting structure according to claim 13, wherein the end surface where the unlocking member abuts against the unlocking arm is an inclined surface.

15. The quick mounting structure according to claim 12, wherein the unlocking structure further comprises a second elastic member, wherein the second elastic member connects the second connector and the unlocking member; and
    the second elastic member is configured to enable the unlocking member and the unlocking arm to be in a state of being separated from each other as a normal state.

16. The quick mounting structure according to claim 1, wherein the quick mounting groove is provided therein with a limiting portion, wherein the limiting portion is arranged in the quick mounting groove on the second connector; and
    the limiting portion is configured to define a depth of the quick mounting block which has entered the quick mounting groove.

17. The quick mounting structure according to claim 16, wherein the limiting portion is a limiting plate, wherein the limiting plate is arranged on a side wall of the quick mounting groove; and
    the limiting plate divides the quick mounting groove into an upper limiting groove and a lower driving groove, wherein the upper limiting groove and the lower driving groove are in communication with each other, the locking block is capable of reciprocating in the upper limiting groove and the lower driving groove, the quick mounting block is arranged in the upper limiting groove, and the rotating shaft is arranged in the lower driving groove.

18. The quick mounting structure according to claim 1, wherein the first elastic member is a spring.

19. The quick mounting structure according to claim 1, wherein the second connector comprises an upper seat and a bottom plate, wherein the quick mounting groove is arranged on the upper seat; and the bottom plate is arranged at one end of the upper seat away from the first connector, and the rotating shaft is arranged on the bottom plate.

20. The quick mounting structure according to claim 19, wherein a support is arranged on the bottom plate, and the rotating shaft is arranged on the support.

* * * * *